United States Patent
Ma et al.

(10) Patent No.: US 11,897,137 B2
(45) Date of Patent: Feb. 13, 2024

(54) METHOD OF IDENTIFYING ROBOT MODEL AUTOMATICALLY AND SAFELY

(71) Applicant: ABB Schweiz AG, Baden (CH)

(72) Inventors: Bojun Ma, Shanghai (CN); Wengui Pan, Shanghai (CN); Yanjun Wang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 252 days.

(21) Appl. No.: 17/005,442

(22) Filed: Aug. 28, 2020

(65) Prior Publication Data

US 2020/0391381 A1 Dec. 17, 2020

Related U.S. Application Data

(63) Continuation of application No. PCT/CN2018/083438, filed on Apr. 17, 2018.

(51) Int. Cl.
*B25J 9/16* (2006.01)

(52) U.S. Cl.
CPC ........... *B25J 9/1653* (2013.01); *B25J 9/1674* (2013.01); *G05B 2219/33105* (2013.01)

(58) Field of Classification Search
CPC ............... B25J 9/1653; B25J 9/1674; G05B 2219/33105
See application file for complete search history.

(56) References Cited

U.S. PATENT DOCUMENTS

| | | | |
|---|---|---|---|
| 10,272,570 B2 * | 4/2019 | Storr | B25J 9/1674 |
| 2004/0148058 A1 | 7/2004 | Johannessen et al. | |
| 2004/0260426 A1 * | 12/2004 | Johannessen | B25J 13/06 700/245 |
| 2009/0198379 A1 * | 8/2009 | Komuro | B25J 9/1674 700/250 |
| 2012/0062156 A1 | 3/2012 | Uebel et al. | |
| 2014/0265990 A1 * | 9/2014 | Chretien | H02P 31/00 318/558 |

(Continued)

FOREIGN PATENT DOCUMENTS

| | | |
|---|---|---|
| CN | 103294046 A | 9/2013 |
| CN | 105690384 A | 6/2016 |

(Continued)

OTHER PUBLICATIONS

Extended European Search Report, issued by the European Patent Office, regarding corresponding patent application Serial No. EP 18915456.0; dated Oct. 26, 2021; 9 pages.

(Continued)

*Primary Examiner* — Abby Y Lin
*Assistant Examiner* — Karston G. Evans
(74) *Attorney, Agent, or Firm* — Greenberg Traurig, LLP

(57) ABSTRACT

The present application relates to a method for robot control. The method includes: obtaining at least one parameter associated with a robot to be controlled by a controller; determining a first identity of the robot based on the at least one parameter; comparing the first identity with a pre-stored second identity; and in response to the first identity matching the second identity, controlling operations of the robot with the controller. The present application further discloses detection of a mismatch between the controller and the robot in an easy, safe and convenient way.

11 Claims, 3 Drawing Sheets

(56) References Cited

U.S. PATENT DOCUMENTS

| | | | |
|---|---|---|---|
| 2015/0336270 A1 | 11/2015 | Storr | |
| 2019/0184557 A1* | 6/2019 | Okumura | B25J 9/1674 |
| 2022/0410389 A1* | 12/2022 | Nagata | B25J 9/1653 |

FOREIGN PATENT DOCUMENTS

| | | | |
|---|---|---|---|
| CN | 106182008 A | 12/2016 | |
| CN | 106325065 A | 1/2017 | |
| CN | 106965179 A | 7/2017 | |
| CN | 107303672 A | 10/2017 | |
| CN | 107398904 A | 11/2017 | |
| CN | 107861488 A | 3/2018 | |
| EP | 1415771 A2 | 5/2004 | |
| EP | 3001033 A1 | 3/2016 | |
| JP | 100234331 B1 * | 4/2000 | B25J 13/00 |
| JP | 2007164398 A * | 6/2007 | |
| JP | 2013056378 A | 3/2013 | |
| KR | 19980022288 A | 7/1998 | |
| WO | 2012102442 A1 | 8/2012 | |

OTHER PUBLICATIONS

Intellectual Property Office of the P.R. China, International Search Report & Written Opinion issued in corresponding Application No. PCT/CN2018/083438, dated Jan. 18, 2019, 10 pp.

* cited by examiner

METHOD OF IDENTIFYING ROBOT MODEL AUTOMATICALLY AND SAFELY

FIELD

Embodiments of present disclosure generally relate to the field of a robotic system comprising a robot and a controller, and more particularly, to a method and apparatus for robot control.

BACKGROUND

With rapid development of science and technology, more and more robotic systems are used in various industrial fields which liberate workers from onerous and repetitive work. A robotic system generally comprises at least a robot and a controller attached to the robot for controlling the movements of the robot. The robot typically comprises a plurality of motors in accordance with the movement freedoms of a robotic arm. The controller is configured with kinematics and dynamics data of the robot, such as reach, weight, and inertia of each robotic arm and electric properties of each motor, which are known as system configuration.

In manufacturing robotic systems, the controllers and the robots are generally manufactured separately and they then are assembled to form a complete robotic system. The following problem might occur. A controller installed with the configuration data of one robot is attached to another robot which is different from the one robot. In this situation, when the controller controls the unmatched robot to move, the robot might move in an unexpected way. This is dangerous and might incur disastrous consequences.

Currently, there is no way to find this mismatch until the abnormal behaviors occur when the robot is controlled to move by the unmatched controller. What makes the situation worse is, even if the brake system functions, the brake usually take time, for example hundreds of milliseconds, to act completely and the robot might cause disastrous consequences during this period, for example hitting the operator or other nearby devices. Accordingly, there is a need to improve the robot control so as to safely and conveniently detect the mismatch between the controller and the robot earlier.

SUMMARY

In a first aspect of the present disclosure, a method for robot control is provided. The method comprises: obtaining at least one parameter associated with a robot to be controlled by a controller; determining a first identity of the robot based on the at least one parameter; comparing the first identity with a pre-stored second identity; and in response to the first identify matching the second identity, controlling operations of the robot with the controller.

In some embodiments, determining the first identity of the robot may comprise: retrieving, based on the at least one parameter, a model of the at least one motor from a database accessible to the controller; and determining the first identity from the model.

In some embodiments, obtaining the at least one parameter may comprise: sending at least one excitation signal to at least one component of the robot from the controller; receiving the at least one feedback signal that is provided by the at least one component in response to the at least one excitation signal; and determining the at least one parameter based on the at least one feedback signal and the at least one excitation signal.

In some embodiments, the at least one excitation signal may comprise at least one excitation signal to windings of the at least one component.

In some embodiments, determining the first identity of the robot may comprise: determining resistance and inductance of the windings based on the at least one feedback signal and the at least one excitation signal; and determining the first identity based on the resistance and the inductance of the windings.

In some embodiments, the pre-stored second identity may be stored in the controller. In some embodiments, the pre-stored second identity may be stored in accessible database which is local to the controller, an external database (for example, in a remote server or cloud), and/or interfaced with the controller In some embodiments, the at least one component may comprises at least one motor of the robot. In some embodiments, the at least one component comprises all motors of the robot.

In some embodiments, the method may further comprise: in response to the first identity mismatching the second identity, reporting an error and/or disabling operations of the robot.

In a second aspect of the present disclosure, a robotic system is provided. The robotic system comprises: a controller configured with computer program instructions therein, the instructions, when executed, causing the controller to perform the method according to the first aspect of the present disclosure: and a robot attached to the robot and configured to be controlled by the controller.

In a third aspect of the present disclosure, a computer program product is provided. The computer program product is tangibly stored in a non-transient computer readable medium and including machine executable instructions which, when executed, cause a machine to perform the method according to first aspect of the present disclosure.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or similar reference symbols are used to indicate the same or similar elements.

DETAILED DESCRIPTION OF EMBODIMENTS

Figure 1:
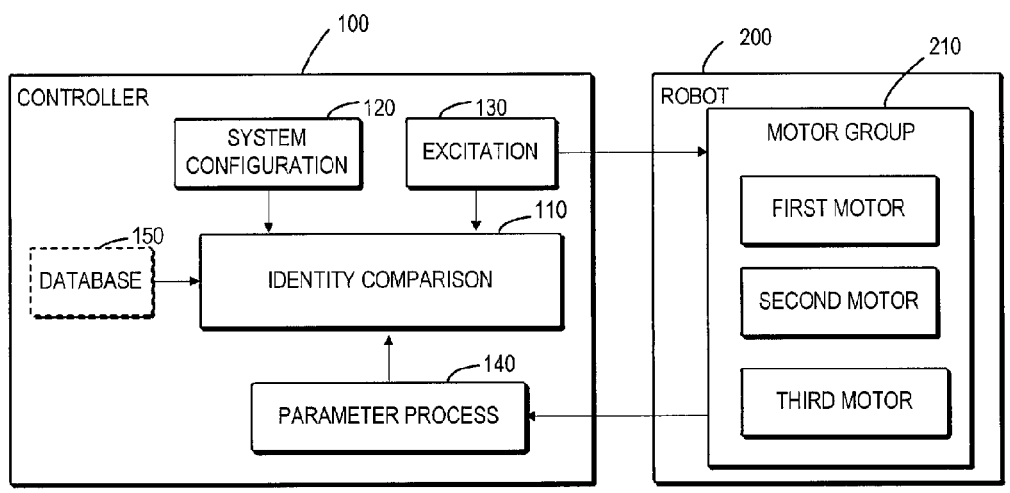
FIG. 1 schematically illustrates a block diagram of a robotic system according to some example embodiments of the present disclosure.

Hereinafter, several example embodiments shown in the drawings will be referred to describe the principle of the present disclosure. It should be understood that these embodiments are described only for enabling those skilled in the art to better understand and then further implement the present disclosure, not intended to limit the scope of the present disclosure in any manner. It is noted that wherever practicable similar or like reference numbers may be used in the figures, and may indicates similar or like functionality. One skilled in the art will readily recognize from the following description that alternative embodiments of the structures and methods illustrated herein may be employed without departing from the principles of the present disclosure described therein.

FIG. 1 schematically illustrates a block diagram of a robotic system according to some example embodiments of the present disclosure. As shown in FIG. 1, a robotic system for industrial applications comprises a controller 100 and a robot 200.

The robot 200 typically comprises a plurality of robotic arms which are driven by a plurality of motors. For illustrative purpose, only three motors are shown in the figures, i.e., the first, second, and third motors. The motors form a motor group 210, which are driving mechanisms for driving the robotic arms. It is to be understood that the scope of the present disclosure is not limited to this example embodiment. The number and types of motors may vary from one to another according to the requirement of industrial applications and the movement complexity of an actuator of the robot. Also, it is to be understood that the scope of the present disclosure is not limited to motors, and can include other kind of driving mechanism, such as hydraulic or pneumatic mechanisms.

The controller 100 is provided in the robotic system and is configured with kinematics and dynamics data of the robot, such as reach, weight, inertial and so on, which are generally called as configuration data of a system. For example, the system configuration stores the kinematics and dynamics data associated to the robot to be controlled and models of the motors. The controller 100 is also configured with control programs and is configured to send commands to the robot 200 to activate or deactivate the motors so as to control the robot arms to move along a programmed path. The controller 100 is shown as block diagrams in FIG. 1. It is to be understood the controller may take any proper physical forms. Examples of the forms include, but are not limited to, shape of box, or a form of an electric board, or an assembly of a plurality of electric boards.

In the shown embodiments of FIG. 1, the controller 100 also comprises several functional units 110, 120, 130, 140, and 150. The details of these units will be discussed hereinafter with reference to FIG. 3.

In order to form a complete robotic system, a controller has to be attached to a robot. In many cases, the physical appearance of the controllers is the same or like. One controller for controlling one kind of robots may be wrongly attached to an unmatched robot. In this case, this mismatch cannot be found by an operator until the robot is controlled to move by the controller. However, when the controller controls the unmatched robot to move, the robot might move in an unexpected way, which is dangerous. The present disclosure provides a method for robot control which can safely and conveniently detect a mismatch between a controller and a robot.

Figure 2:
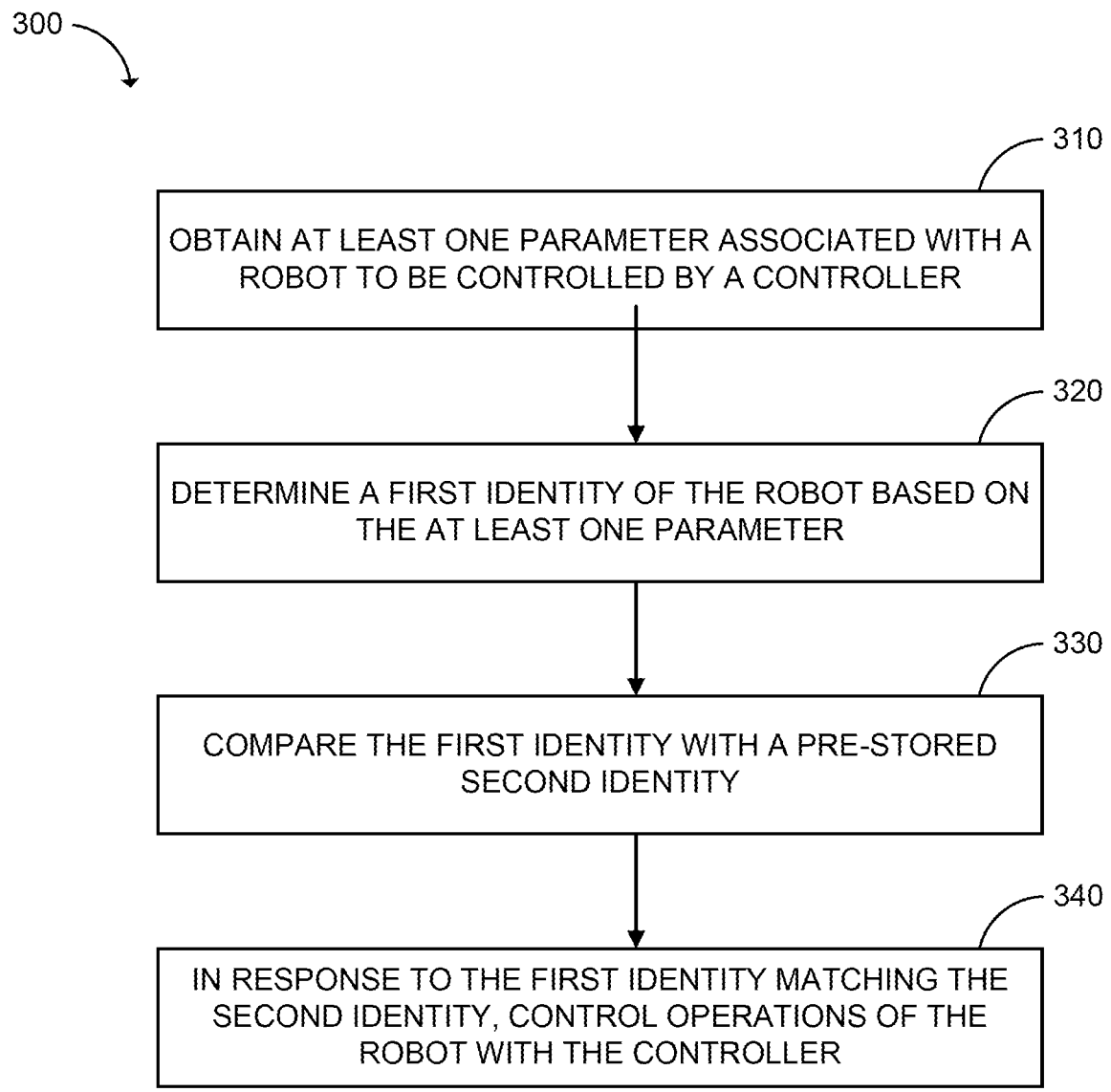
FIG. 2 schematically illustrates a flowchart of a method for robot control according to some example embodiments of the present disclosure.

FIG. 2 schematically illustrates a flowchart of a method 300 for robot control according to some example embodiments of the present disclosure. It is to be understood that the method 300 may further include additional acts not shown and/or omit some acts as shown. The scope of the present disclosure is not limited in this regard.

In block 310, at least one parameter associated with a robot to be controlled by a controller is obtained. In some embodiments, the at least one parameter associated with a robot may reflect the characteristic of the robot and may be used to identify the robot. The characteristic of the robot makes it possible to distinguish one robot from another robot. The at least one parameter associated with the robot can be obtained in various manners. For example, when the controller is attached to the robot, the robot might actively send the at least one parameter associated with the robot to the controller. Alternatively, the controller might send a request to the robot for the least one parameter.

In some embodiments, at least one excitation signal maybe is sent to at least one component of the robot from the controller. The at least one component generates signals in response to the at least one excitation signal and the responsive signal is feedback to the controller. The at least one parameter is determined based on the feedback.

In block 320, a first identity of the robot is determined based on the at least one parameter. In some embodiments, the first identity may be associated with the models of the robots. In some embodiments, the first identity may be associated with the characteristic components arranged in the robots. The characteristic components can distinguish from one robot from another. In some embodiments, the characteristic components may be motors in the robot. In this case, a model of the at least one motor is retrieved from a database based on the at least one parameter. The database is accessible to the controller. The database is local to the controller, an external database, and/or interfaced with the controller. The first identity is then determined from the model In block 330, the first identity is compared with a pre-stored second identity. In some embodiments, the pre-stored second identity may be used to identify the robot models that the controller aims to control. In some embodiments, the pre-stored second identity may be stored in the controller. For example, the pre-stored second identity may be acquired from the configuration data of the controller.

In block 340, when the first identify matches the second identity, normal operations of the robot is allowed and is controlled by the controller. In some embodiments, when the first identity mismatches the second identity, an error is reported and/or operations of the robot are disabled.

According to the present disclosure, the above steps are performed before the robot is controlled to move. Accordingly, a mismatch between the controller and the robot can be detected at an early stage. Thus, the robotic system can operate in a safer way and the potential danger to operators or devices caused by the mismatch can be avoided.

As discussed above, the robot might comprise a plurality of motors. The number of motor may be at least 3 and may be up to 20 or more. Since motors are core driving component in robot 200, the motors can be used as characteristic components and can identify the robot. Thus, different robots can be distinguished from each other by the motors. The following takes motors in robots as an example for identifying a robot.

Figure 3:
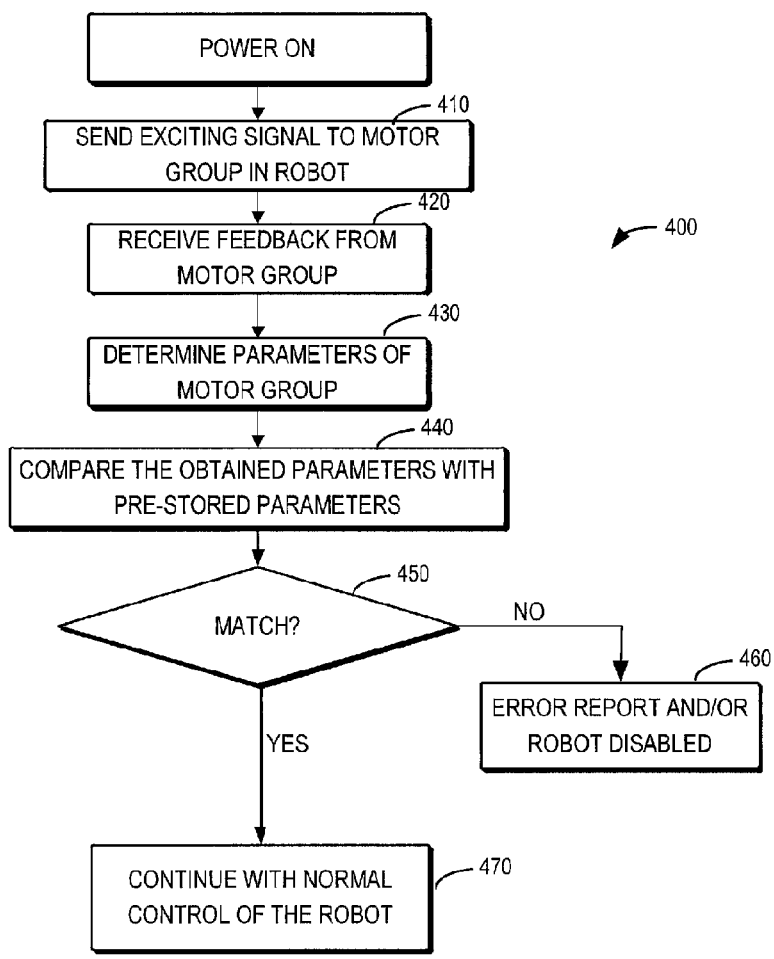
FIG. 3 schematically illustrates a flowchart of a method for robot control according to some example embodiments of the present disclosure.

FIG. 3 schematically illustrates a flowchart of a method for robot control according to some example embodiments of the present disclosure. It is to be understood that the method 400 may further include additional acts not shown and/or omit some acts as shown. The scope of the present disclosure is not limited in this regard. The method 400 will be described with reference to FIG. 1.

As shown in FIG. 1, according to some example embodiments of the present disclosure, the controller 100 may comprises an identity comparison unit 110, a system configuration unit 120, an excitation unit 130, a parameter process unit 140, and a database 150. A dashed block in FIG. 1 means an optional unit.

The system configuration unit 120 may comprise kinematics and dynamics data of the robot, such as reach, weight, inertial and so on. The excitation unit 130 is configured to send at least one excitation signal to at least one characteristic component (for example motors) of the robot 200. The parameter process unit 140 is configured to receive feedbacks from the motors. In some embodiments, the parameter process unit 140 may also be configured to process the feedbacks to obtain the parameters of the motors.

The identity comparison unit 110 is configured to retrieve models of the motors from the database 150 and may determine the identity of the robot 200 based on the received models. The database 150 may be local to the controller, an external database, and/or interfaced with the controller. The identity comparison unit 110 is also configured to obtain a pre-stored identity. In some embodiments, the identity comparison unit 110 obtains the pre-stored identity from the configuration data of the controller 100. Alternatively, the pre-stored identity may be retrieved from the database 150 or another database which may be local to the controller, an external database, and/or interfaced with the controller.

In some embodiments, the excitation unit 130 may send excitation signals in various ways according to the property of the characteristic components of the robot 200. In some embodiments, the excitation unit 130 can send a plurality of excitation signals to each motor in the robot 200 one at a time respectively. In some embodiments, the excitation unit 130 may send only one excitation signal to one motor in the robot 200 at a time.

The types of excitation signals may include any kind of proper signals. In some embodiments, the excitation signals can trigger electrical signals in the motors of the robot 200. In some embodiments, the exciting signals may be sent to the windings of the motors. In some embodiments, according to the types of the motors, the excitation signals may be sent to the stator windings or the rotor windings of the motors. As known, the motors of the robot 200 are control objects of the controller and the robot 200 has various sensors for sensing the operational status of the motor so as to provide actuate control of the robot. In this case, the excitation signals may trigger electrical signals which can be detected by these existing sensors. In this case, there is no need to provide additional sensors. For example, the excitation signals may be sine wave signals, pulse signals, rectangular signals, and sweeping signals, or so on.

As shown in FIG. 3, in some embodiments, the method 400 of robot control of the present disclosure is performed upon the controller is powered on.

In block 410, an exciting signal from the excitation unit 130 is sent to the motors in the robot 200. For example, a set of sine wave excitation voltage is applied to a stator winding of each phase one by one.

In block 420, the feedback signals of the motors are received by the parameter process unit 140. Since the robot have various feedback sensors, these sensors can directly be used to collect the feedback signals and the signals can be sent to the parameter process unit 140 via the existing communication channel. For example, when a set of sine wave excitation voltage is applied to each phase, the feedback currents in the windings can be measured and are sent to the parameter process unit 140. The feedback currents for each phase can be collected by the parameter process unit 140 respectively.

In block 430, parameters of the motors are determined by the parameter process unit 140. For example, in the above case, the resistance and inductance of each stator winding can be determined based on the exciting voltage and the feedback measured current. Thus, the robot 200 can be identified as a group of resistance and inductance parameters of stator windings of the motors in the robot. When this group of parameters can be used to identify the robot, this group of parameters can be considered as an identity of the robot. In some embodiments, the models of motors are further retrieved from the database 150 based on this group of parameters.

In block 440, in the identity comparison unit 110, the obtained parameters of the motors are compared with pre-stored parameters. In some embodiments, the pre-stored parameters may be used to identify the motors to be controlled by the controller and are of the same type as the obtained parameters of the motors. In some embodiments, the pre-stored parameters may be models of motors when models of motors may be used to identify the robots. In this case, the models of the motors may be from the configuration data of the controller. In this case, the term "parameters" can be replaced by "identity" in the sense that both are for identifying the robot.

In block 450, a comparison decision is made. If the obtained parameters or identity matches with the pre-stored parameters or identity, then the robot can be normally controlled (in block 470). If the obtained parameters or identity mismatches with the pre-stored parameters or identity, then an error is reported and/or the robot is disabled (in block 460).

According to embodiments of the present disclosure, by sending exciting signals to the windings of the motors in the robot 200, the robot 200 is thus identified as the parameters of the motors. In this manner, there is no need to provide any additional components, the mismatch between the robot and the controller can be detected easily and safely.

Compared to an approach where a memory card is inserted or embedded to the robot to store the identity of the robot, no extra memory board and associated device are needed in embodiments of the present disclosure. Furthermore, the identity of the robot is identified as parameters of the motors. In this way, the detection can be more reliable since the motors are indispensable part of a robot and are also the control objects of the controller. Furthermore, the method can be automatically performed in/or by the controller, the mismatch between the controller and the robot can be detected at an early stage, which can further improve the safety.

In another aspect of the present disclosure, a robotic system is provided. The robotic system comprises a controller configured with computer program instructions therein, the instructions, when executed, causing the controller to perform the above method: and a robot attached to the robot and configured to be controlled by the controller.

The subject matter described herein may be embodied as a computer program product. The computer program product is tangibly stored in a non-transient computer readable medium and includes machine executable instructions. The machine executable instructions which, when executed, cause a machine to perform the methods 300 and 400 as described above.

The above-described procedures and processes, such as the methods 300 and 400 can be implemented by controller 100. For example, in some embodiments, the methods 300 and 400 can be implemented as a computer software program which is tangibly embodied on a machine readable medium, for instance, the memory. In some embodiments, part or all of the computer program can be loaded to and/or installed on the controller 100 shown in FIG. 1. The computer program, when loaded and executed by the controller 100, may execute one or more acts of the methods 300 and 400 as described above. Alternatively, the controller 100 can also be configured to implement the methods 300 and 400 as described above in any other proper manner (for example, by means of firmware).

In the context of the subject matter described herein, a memory may be any tangible medium that can contain, or store a program for use by or in connection with an instruction execution system, apparatus, or device. The memory may be a machine readable signal medium or a machine readable storage medium. A memory may include but not limited to an electronic, magnetic, optical, electromagnetic, infrared, or semiconductor system, apparatus, or device, or any suitable combination of the foregoing. More specific examples of the memory would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. A method for robot control, comprising:
   obtaining at least one parameter from at least one motor in response to a request from a controller, the at least one parameter associated with a characteristic of the at least one motor arranged in a robot to be controlled by a controller;
   determining a first identity of the robot based on the at least one parameter,
   wherein the first identity identifies the at least one motor arranged in the robot;
   comparing the first identity with a second identity,
   wherein the second identity is stored in the controller;
   determining an identity of the robot to be controlled by the controller from other robots based on the comparison,
   wherein the robot is distinguished from the other robots based on the at least one parameter associated with the at least one motor arranged in the robot; and
   in response to the first identity matching the second identity, controlling operations of the robot with the controller;
   wherein obtaining the at least one parameter comprises:
   sending at least one excitation signal to at least one motor of the robot from the controller,
   receiving at least one feedback signal that is provided by the at least one motor in response to the at least one excitation signal, and
   determining the at least one parameter based on the at least one feedback signal and the at least one excitation signal.

2. The method according to claim 1, wherein determining the first identity of the robot comprises:
   retrieving, based on the at least one parameter, a model of the at least one motor of the robot from a database accessible to the controller.

3. The method according to claim 1, wherein the at least one excitation signal comprises at least one excitation signal to windings of the at least one motor.

4. The method according to claim 3, wherein determining the first identity of the robot comprises:
   determining resistance and inductance of the windings based on the at least one feedback signal and the at least one excitation signal; and
   determining the first identity based on the resistance and the inductance of the windings.

5. The method according to claim 1, wherein the at least one motor comprises all motors of the robot.

6. The method according to claim 1, further comprising:
   in response to the first identity mismatching the second identity, reporting an error and/or disabling operations of the robot.

7. A robotic system, comprising:
   a robot comprising:
      at least one motor; and
   a controller attached to the robot and configured to:
   obtain at least one parameter from the at least one motor in response to a request from a controller, the at least one parameter associated with a characteristic of the at least one motor arranged in the robot to be controlled by the controller;
   determine a first identity of the robot based on the at least one parameter,
   wherein the first identity identified the at least one motor arranged in the robot;
   compare the first identity with a second identity,
   wherein the second identity is stored in the controller;
   determine an identity of the robot to be controlled by the controller from other robots based on the comparison,
   wherein the robot is distinguished from the other robots based on the at least one parameter associated with the at least one motor arranged in the robot; and
   in response to the first identity matching the second identity, control operations of the robot with the controller;

wherein obtaining the at least one parameter comprises:
  sending at least one excitation signal to at least one motor of the robot from the controller,
  receiving at least one feedback signal that is provided by the at least one motor in response to the at least one excitation signal, and
  determining the at least one parameter based on the at least one feedback signal and the at least one excitation signal.

8. A computer program product tangibly stored in a non-transient computer readable medium and including machine executable instructions which, when executed, cause a machine to perform the method according to claim 1.

9. The computer program product according to claim 8, wherein determining the first identity of the robot comprises:
  retrieving, based on the at least one parameter, a model of the at least one motor from a database accessible to the controller; and
  determining the first identity from the model.

10. The computer program product according to claim 8 wherein the at least one excitation signal comprises at least one excitation signal to windings of the at least one motor.

11. The computer program product according to claim 10, wherein determining the first identity of the robot comprises:
  determining resistance and inductance of the windings based on the at least one feedback signal and the at least one excitation signal; and
  determining the first identity based on the resistance and the inductance of the windings.

* * * * *